(12) United States Patent
Smith et al.

(10) Patent No.: US 7,600,184 B2
(45) Date of Patent: Oct. 6, 2009

(54) HIGH DENSITY VISUALIZATIONS FOR THREADED INFORMATION

(75) Inventors: Marc A. Smith, Redmond, WA (US); Steven M. Drucker, Bellevue, WA (US); Rebecca Xiong, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 674 days.

(21) Appl. No.: 11/275,547

(22) Filed: Jan. 13, 2006

(65) Prior Publication Data

US 2006/0117273 A1 Jun. 1, 2006

Related U.S. Application Data

(62) Division of application No. 09/392,468, filed on Sep. 9, 1999, now Pat. No. 7,007,226.

(60) Provisional application No. 60/100,420, filed on Sep. 15, 1998.

(51) Int. Cl.
*G06F 17/00* (2006.01)
*G06F 3/00* (2006.01)

(52) U.S. Cl. .................. 715/244; 715/256; 715/758

(58) Field of Classification Search .............. 715/243, 715/245, 256, 244, 246, 254, 255, 273, 758
See application file for complete search history.

(56) References Cited

U.S. PATENT DOCUMENTS

| | | | | |
|---|---|---|---|---|
| 5,276,793 A | * | 1/1994 | Borgendale et al. | 707/513 |
| 5,388,196 A | * | 2/1995 | Pajak et al. | 345/751 |
| 5,832,502 A | * | 11/1998 | Durham et al. | 707/104.1 |
| 5,930,809 A | * | 7/1999 | Middlebrook | 345/780 |
| 5,933,599 A | * | 8/1999 | Nolan | 345/734 |
| 5,974,407 A | * | 10/1999 | Sacks | 707/2 |
| 6,020,884 A | * | 2/2000 | MacNaughton et al. | 715/747 |
| 6,085,202 A | * | 7/2000 | Rao et al. | 707/509 |
| 6,199,098 B1 | * | 3/2001 | Jones et al. | 709/203 |
| 6,252,597 B1 | * | 6/2001 | Lokuge | 345/841 |
| 6,484,196 B1 | * | 11/2002 | Maurille | 709/206 |
| 6,865,715 B2 | * | 3/2005 | Uchino et al. | 715/277 |
| 7,007,226 B1 | | 2/2006 | Smith et al. | |

OTHER PUBLICATIONS

Windiff: A Graphical Difference Program, MSDN Library, Apr. 1998. (The corresponding document was previously submitted in connection with parent U.S. Appl. No. 09/392,468 and is not being resubmitted herewith per 37 CFR 1.98 (d).).

* cited by examiner

*Primary Examiner*—Laurie Ries

(57) ABSTRACT

High-density computer display visualization formats provide improved visualization of large amounts of threaded information. These visualization formats are suitable for a wide variety of threaded information environments including newsgroups, threaded Web discussions, chats, e-mail inboxes, etc. In one implementation, the threaded message visualization represents each post with a generally one-dimensional or narrow entry line. The entry lines are horizontal and arranged vertically in substantially the same indented threading arrangement as the text of a conventional prior art visualization. In other implementations, the appearance (e.g., color), length, and position of entry lines can represent additional selected information while maintaining the generally one-dimensional character of the entry lines.

13 Claims, 8 Drawing Sheets

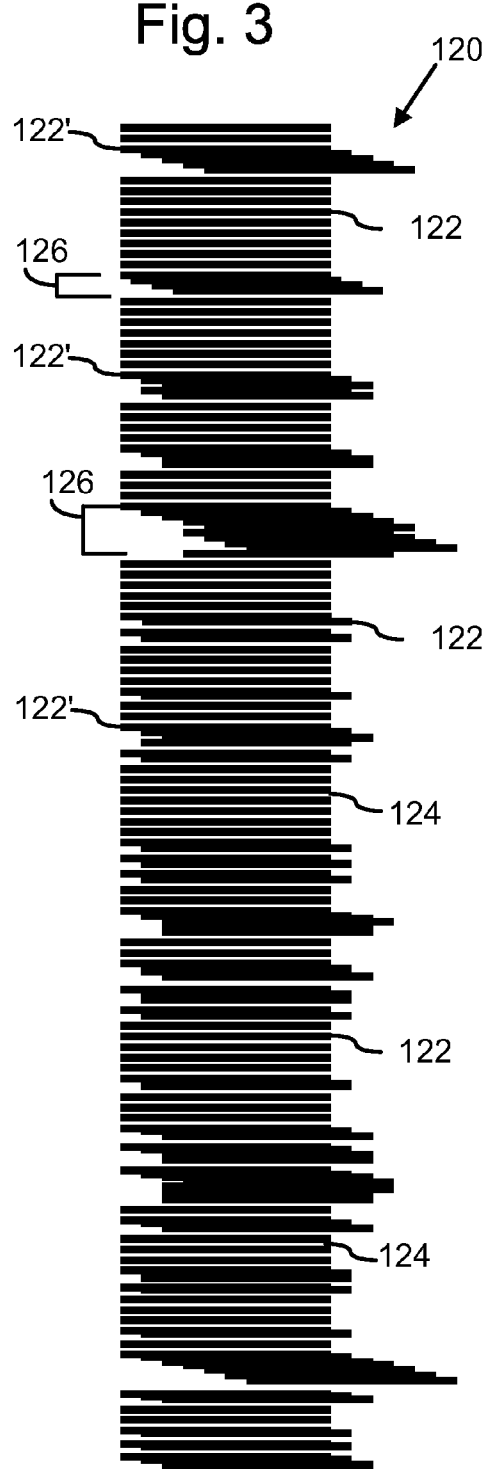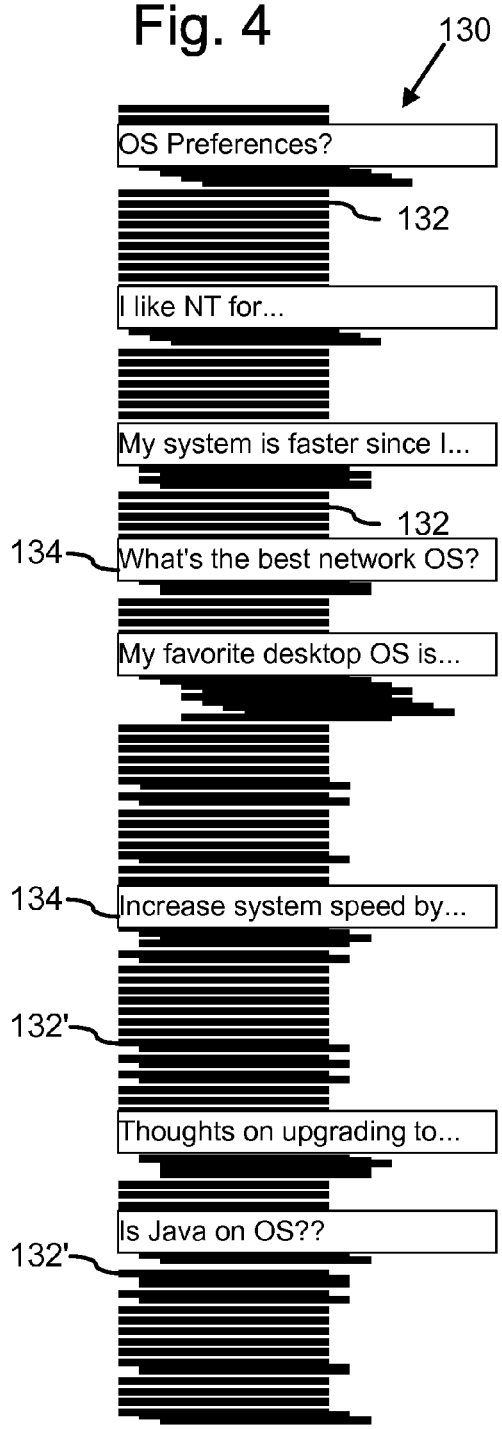

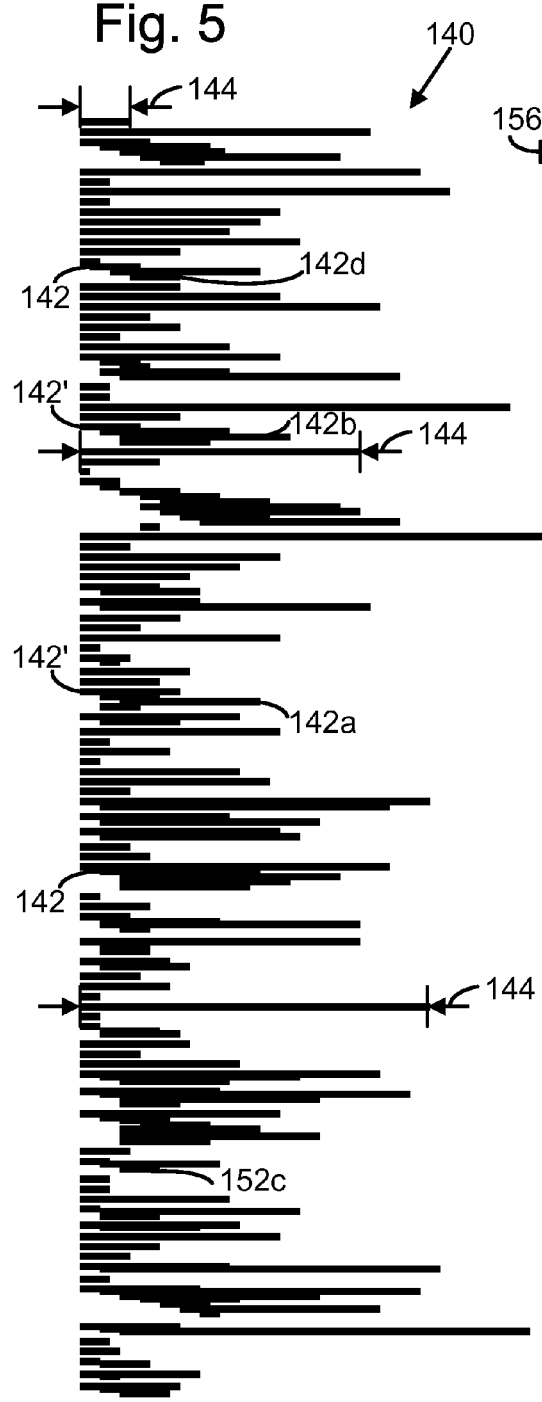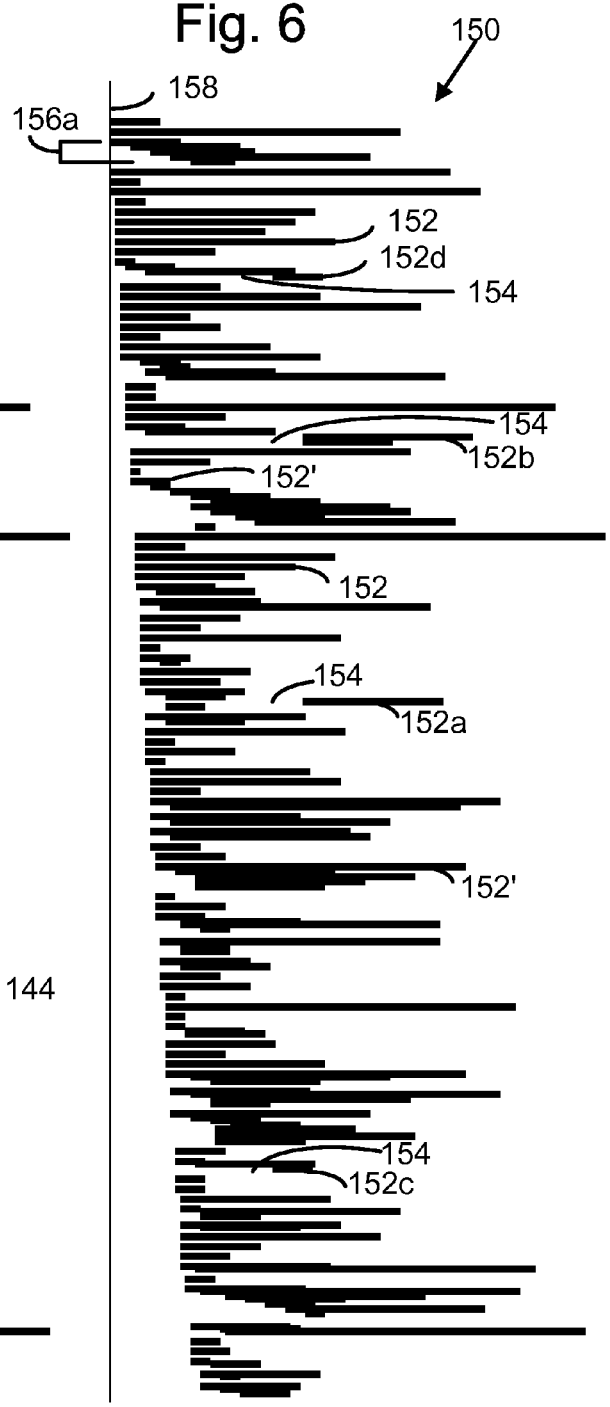

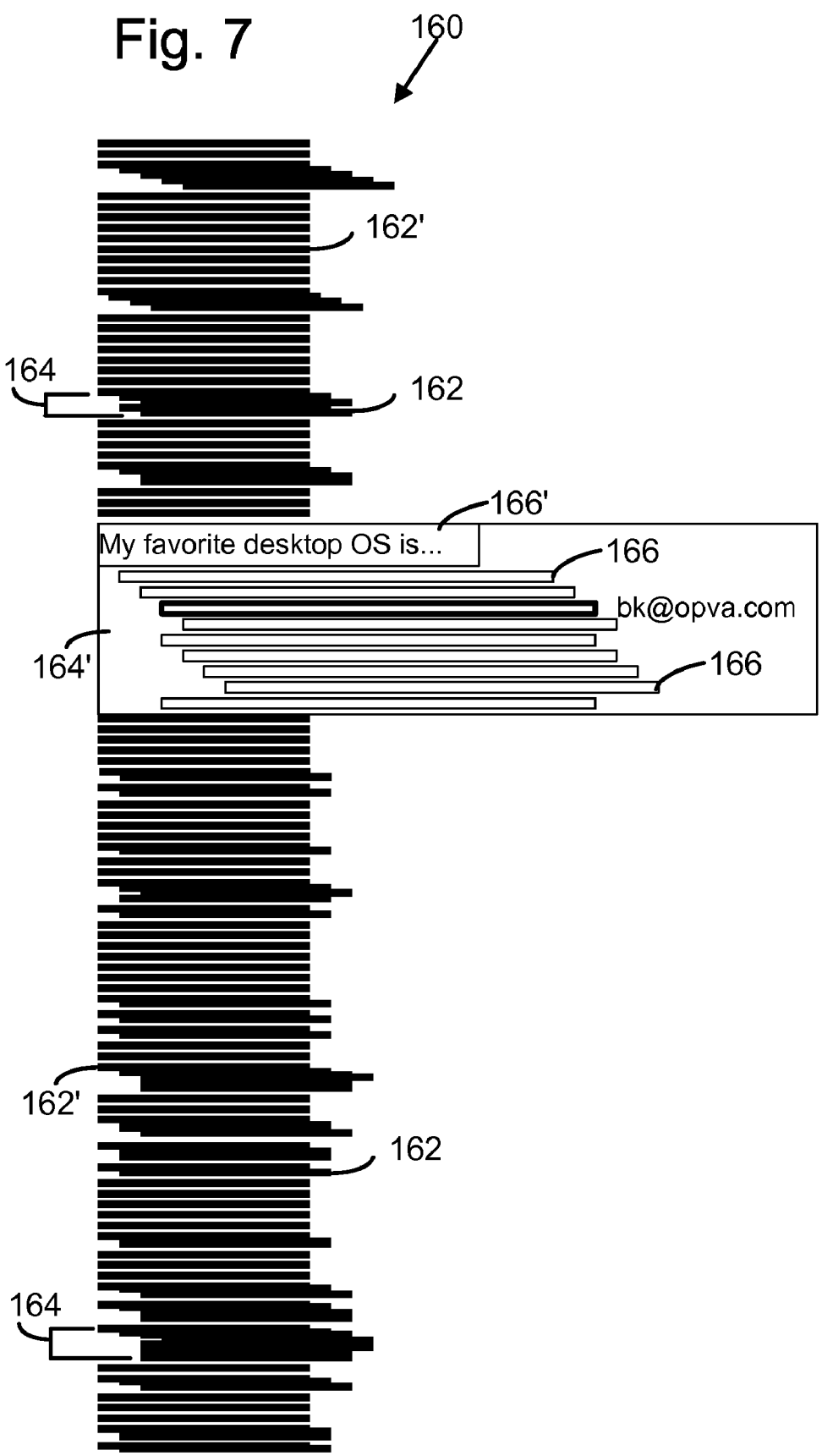

HIGH DENSITY VISUALIZATIONS FOR THREADED INFORMATION

CROSS-REFERENCE TO RELATED APPLICATIONS

This application claims priority to and is a divisional of prior U.S. patent application Ser. No. 09/392,468, filed Sep. 9, 1999, titled "High Density Visualizations for Threaded Information," which is incorporated by reference herein and which in turns claims priority to provisional U.S. Patent Application No. 60/100,420, filed Sep. 15, 1998.

FIELD OF THE INVENTION

The present invention relates to visualizations for interactive collaborative information and, in particular, to systems and methods for visualizing relationships in information relating to computer network interaction media.

BACKGROUND AND SUMMARY OF THE INVENTION

Many computer information systems organize hierarchically organized information, or information entries, according to links or references between the entries. An example of such information entries are bulletin board posts that reference or reply to other posts. As an organizational aid, posts that reference or reply to another post are often nested or positioned directly under it to form a "thread." Threads are organizational trees with an initial post at a top level and branches to all the responsive posts, which may themselves have branches as well. Such information systems may be called threaded information environments and can include information from the World Wide Web, Usenet newsgroups, email lists, etc.

With reference to Usenet newsgroups, for example, typical threaded information systems can have dozens or even hundreds of entries or posts. A common visualization format for a newsgroup is a vertical text listing of posts arranged generally according to the times they were posted. Threads are illustrated by positioning responsive posts in time sequence immediately under the original post in the thread.

Conventional computer displays or visualizations for such information environments can display only a small portion of the total posts in a group. This limitation arises from the use of text characters to represent each of the posts. Text characters are formed of predefined pixel arrays, which have different sizes according to the font (or typeset) and font size. Font sizes of between 9 points and 12 points are commonly used and discernible in computer display applications, although font sizes as small as 8 points may be discernible by some users. Text characters in an 8 point font size are formed of pixel arrays with vertical dimensions of 5-8 pixels. In addition, successive lines of text in a relatively dense single line spacing are typically separated by 7-8 pixels. As a result, about 16 pixels are required for each line of text referencing a post in a conventional threaded message system.

Accordingly, high-density computer display visualization formats are provided to improve the visualization of large amounts of threaded information. These visualization formats are suitable for a wide variety of threaded information environments including newsgroups, threaded Web discussions, chats, e-mail inboxes, etc.

In one implementation, the threaded message visualization represents each post with a generally one-dimensional or narrow entry line. The entry lines are horizontal and arranged vertically in substantially the same indented threading arrangement as the text of a conventional prior art visualization. Each of the entry lines is generally one-dimensional or narrow in that it has a vertical height or thickness insufficient to render text characters (e.g., 1-3 pixels). In other implementations, the appearance (e.g., color), length, and position of entry lines can represent additional selected information while maintaining the generally one-dimensional character of the entry lines.

Additional objects and advantages of the present invention will be apparent from the detailed description of the preferred embodiment thereof, which proceeds with reference to the accompanying drawings.

BRIEF DESCRIPTION OF THE DRAWINGS

FIG. 3 illustrates a high-density visualization of threaded information according to the present invention.

FIG. 4 illustrates a high-density threaded information visualization that includes text information.

FIG. 5 illustrates a high-density threaded information visualization in which information entries have lengths that correspond to selected information.

FIG. 6 illustrates a high-density threaded information visualization in which information entries have positions that correspond to selected information FIG. 7 illustrates a high-density threaded information visualization high highlighting of a selected thread.

DETAILED DESCRIPTION OF PREFERRED EMBODIMENTS

Figure 1:
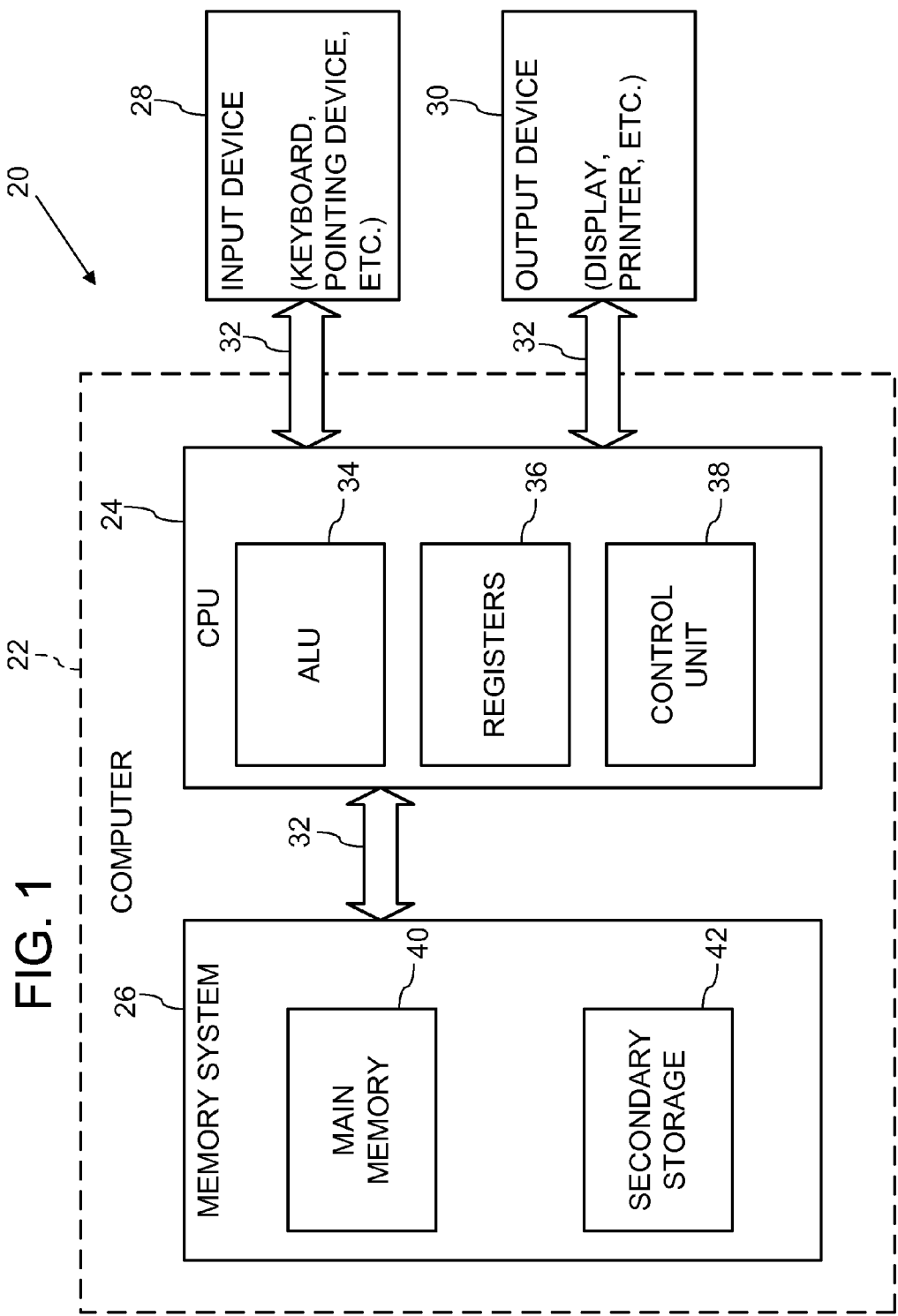
FIG. 1 is a block diagram of a computer system that may be used to implement the present invention.

FIG. 1 illustrates an operating environment for an embodiment of the present invention as a computer system 20 with a computer 22 that comprises at least one high speed processing unit (CPU) 24 in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPC from IBM and Motorola.

The memory system 26 generally includes high speed main memory 40 in the form of a medium such as random access memory (RAM) and read only memory (ROM) semiconductor devices, and secondary storage 42 in the form of long term storage mediums such as floppy disks, hard disks, tape, CD ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28 and 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed and may be associated with the operating system or the application program as appropriate. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

One implementation of the present invention provides visualizations of a threaded information environment such as is available from the World Wide Web, Usenet newsgroups, email lists, and other computer network interaction media. Some interaction media, such as Usenet (NNTP) newsgroups and some World Wide Web (HTTP) sites, include threaded message posts that form what is sometimes called a bulletin board. The following description refers by way of example to Usenet newsgroups, but is similarly applicable to other computer-related interaction media.

Usenet is a collection of messages, referred to as posts, available through the Network News Transport Protocol (NNTP). The posts available through NNTP are organized into newsgroups that are named according to a hierarchical name convention. At the highest level are 15 or more general categories, such as rec, comp, alt, sci, etc., that identify the general subject (i.e., recreation, computer, alternative, science, etc.) of a set of newsgroups. Additional terms are added hierarchically to uniquely define a newsgroup within a collection of others (e.g., comp.lang.perl.misc or rec.pets.misc.kids.pregnancy).

Many posts reference or reply to another post. As an organizational aid, posts that reference or reply to another post are nested or positioned directly under it to form a "thread." Threads are organizational trees with an initial post at a top level and branches to all the responsive posts, which may themselves have branches as well. A post with no responses or branches is sometimes called "barren."

Figure 2:
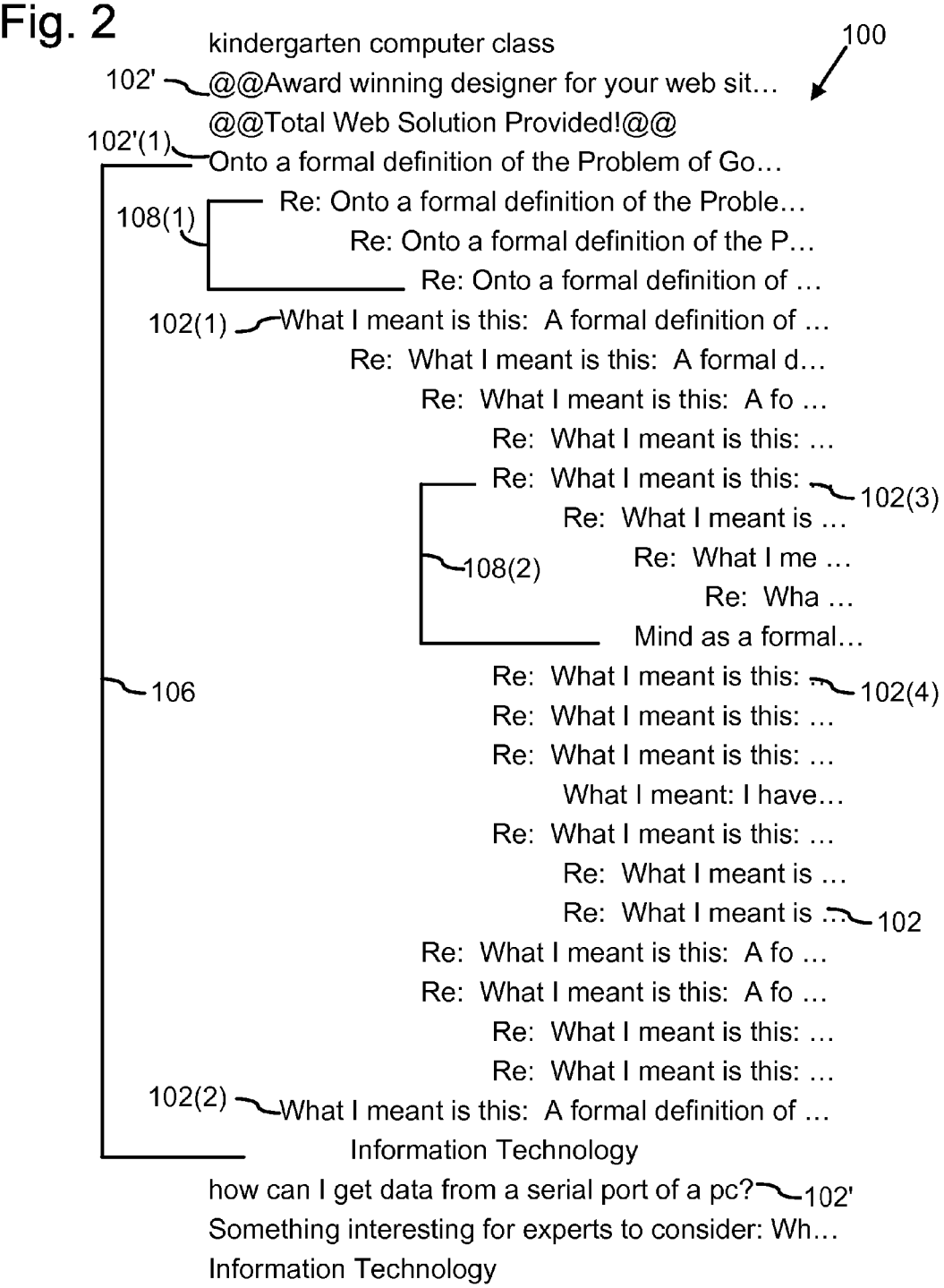
FIG. 2 is a diagram illustrating an exemplary prior art computer display visualization of threaded information representing posts in a newsgroup.

FIG. 2 is a diagram illustrating an exemplary prior art computer display visualization 100 of threaded posts or messages 102 in a threaded information system such as a newsgroup. Every post 102 in visualization 100 is identified by text, such as the subject line or title for the post. It will be appreciated, however, that each post or message in the newsgroup typically includes in its body text or information (e.g., data files) in addition to the subject line or title. Accordingly, it will be understood that posts 102 in visualization 100 are representations of underlying posted information (e.g., messages).

Posts 102 that reference other posts are arranged as threads 106. Posts that do not reference other posts are referred to herein as top-level posts 102', which are a subset of posts 102. Top-level posts 102' initiate threads 106 (e.g., only one thread 106 shown in FIG. 2), and the other posts 102 in the thread 106 are sometimes called inferior posts. Although a threaded information environment will commonly include many threads 106, at least some top-level posts 102' are typically not referenced by other posts 102. The top-level posts 102' that are not referenced by other posts are sometimes called barren.

Moreover, sub-threads 108 (e.g., 108(1) and 108(2)) are often initiated at posts 102 other than top-level posts 102'. These sub-threads are analogous to threads 106. For purposes of illustration, the following description will refer primarily to threads 106. It will be appreciated, however, that features of the present invention relating to threads 106 could be similarly applied to sub-threads 108.

Thread 106 is represented in visualization 100 by a left-justified top-level post 102'(1) and by grouping together right-indented posts 102 that directly or indirectly reference the top-level post 102'(1). A direct reference in a post 102 explicitly responds to or identifies the referenced post. An indirect reference responds to or identifies another post 102 that either directly or indirectly identifies the referenced post. Posts 102(1) and 102(2) directly reference top-level post 102', and posts 102(3) and 102(4) indirectly reference it.

The inferior posts 102 in a thread 106 are positioned successively below the top-level post 102'. Generally, inferior posts 102 that directly reference top-level post 102' or another post 102 in the thread 106 are positioned immediately below the referenced post (according to when the postings were made) and are indented to the right of the referenced post. Sometimes a sub-thread 108 (e.g., 108(2)) may form between successive posts (e.g., 102(3) and 102(4)) in a thread. This arrangement of posts 102 may be referred to as an indented threading arrangement.

Typical threaded information systems can have dozens or even hundreds of entries or posts. Prior art visualization 100 can display only a small portion of the posts in such systems. This limitation arises from the use of text characters to represent each of the posts 102. Text characters are formed of predefined pixel arrays, which have different sizes according to the font (or typeset) and font size. Font sizes of between 9 points and 12 points are commonly used and discernible in computer display applications, although font sizes as small as 8 points may be discernible by some users.

Text characters in even an 8 point font size are formed of pixel arrays with vertical dimensions of 5-8 pixels. In addition, successive lines of text in a relatively dense single line spacing are typically separated by 7-8 pixels. Accordingly, about 16 pixels are required for each line of text referencing a post in a conventional threaded message system. More commonly, text characters of at least a 9 point font size would be employed, which could require at least about 18 pixels of vertical display area for each post in a threaded message system.

In accordance with the present invention, FIG. 3 illustrates a high density computer display visualization format 120 of threaded posts or messages 122 in a threaded information system or environment such as, for example, a newsgroup. Although the following description refers to posts in a newsgroup, it will be appreciated that high density visualization 120 is similarly applicable to other threaded information environments such as threaded Web discussions, chats, e-mail inboxes, etc.

Threaded message visualization 120 represents each post with a generally one-dimensional or narrow entry line 122. In the illustration of FIG. 3, entry lines 122 are horizontal and arranged vertically in substantially the same indented threading arrangement as the text of prior art visualization of FIG. 2. Each of lines 122 is generally one-dimensional or narrow in that it has a vertical height or thickness insufficient to render text characters (e.g., 1-3 pixels). In this implementation, lines 122', which are subsets of lines 122, represent top-level posts and have a left-most alignment. Lines 122' are vertically separated from other lines 122 by minimal vertical spacings 124 of 1-2 pixels to distinguish successive threads 126. As illustrated, lines 122 within a thread 126 are not separated even by minimal vertical spacings 124, although minimal vertical spacings 124 could be employed for lines 122 within a thread 126.

Threaded message visualization 120 provides a high density representation of a threaded information environment, such as a newsgroup, threaded Web discussions, chats, e-mail inboxes, etc. Threaded message visualization 120 can represent each post in such as system with display dimensions as small as 1 or 2 pixels. For example, all lines 122 could be formed with a 1-pixel thickness, and spacings 124 of 1 pixel could be provided for top-level posts 122'. Optionally, even spacings 124 could be omitted.

In contrast, conventional visualization 100 employing text characters with a 9 point font size can require 18 pixels of vertical display area for each post. With about 30 percent of posts being threaded, for example, threaded message visualization 120 can display 6.67 times as many posts as prior art visualization 100. As a result, threaded message visualization 120 can display simultaneously information for about 214 posts in an area that could display information on only about the 32 posts illustrated in FIG. 2. In addition, the simple graphical character of visualization 120 can allow it to be easily scrolled to provide a user with information about an even greater number of posts.

FIG. 3 shows lines 122 in black. While such a visualization can provide a user with significant information about the structure of a threaded information environment, colored entry lines 122 can provide additional information while maintaining the high density of visualization 120. In various implementations, entry lines 122 may be colored according to selected information in or related to the underlying posts, messages, etc. represented by lines 122. In the context of a newsgroup, for example, entry lines 122 may be colored according to the ages of the posts represented by entry lines 122, according to the frequencies with which the authors of the posts (sometimes called posters) contribute to the group, etc. Similarly, entry lines 122 may alternatively or additional have lengths or positions according to other selected information, as described below in greater detail.

FIG. 4 illustrates an alternative high-density computer display visualization format 130 of threaded posts or messages 132 in, for example, a newsgroup. High-density visualization 130 corresponds to substantially the same exemplary threaded information (i.e., posts) as visualization 120 in FIG. 3, except that the former truncates a portion of the information rendered in the latter.

Threaded message visualization 130 represents most posts with narrow entry lines 132 in an indented threading arrangement having lines 132' that represent top-level posts, substantially similar to visualization 120. Visualization 130 further includes, however, text entry labels 134 that include text information (e.g., a post subject line or title, as illustrated) for the top-level posts of selected threads 136'. In one implementation, the top-level posts for threads 136' having more than a predetermined number of posts 132 are rendered with entry labels 134. As illustrated in FIG. 4, entry labels 134 are rendered for top-level posts of threads with more than three posts 132. The minimum number of posts in a thread 136 at which entry labels 134 are applied may be selectable by a user observing visualization 130.

FIG. 5 illustrates another alternative high-density computer display visualization format 140 of threaded posts or messages 142 in, for example, a newsgroup. High-density visualization 140 corresponds to substantially the same exemplary threaded information (i.e., posts) as visualization 120 in FIG. 3.

Threaded message visualization 140 represents posts with generally one-dimensional narrow entry lines 142 in an indented threading arrangement with lines 142' that represent top-level posts, substantially similar to visualization 120. In addition, lines 142 of visualization 140 are rendered with lengths 144 corresponding to selected information regarding the posts represented by lines 142. For example, lengths 144 can correspond to the amount of information (e.g., numbers of text lines or characters) in the posts. While maintaining the generally one-dimensional representations of posts provided by visualization 120 (FIG. 3), visualization 140 further provides graphical additional information regarding the posts. It will be appreciated that the features of visualizations 130 (FIG. 4) and 140 (FIG. 5) could be combined together in a unitary visualization.

FIG. 6 illustrates another alternative high-density computer display visualization format 150 of threaded posts or messages 152 in, for example, a newsgroup. The exemplary high-density visualization 150 includes aspects of visualization 140 (FIG. 5) for purposes of illustrating aspects of visualization 150.

Threaded message visualization 150 represents posts with generally one-dimensional narrow lines 152 that are positioned in a modified indented threading arrangement having lines 152' that represent top-level posts, substantially similar to visualization 120. The modified indented threading arrangement of visualization 150 includes lateral shifts 154 in the positions of lines 152 according to corresponding to selected information regarding the posts represented by lines 152. For example, lateral shifts 154 can correspond to the times at which the messages represented by lines 152 are posted.

In the illustrated implementation, the inferior entry lines 152 of a thread 156 (e.g., thread 156a) include referencing indentations according to which prior posts are directly referenced. These referencing indentations are substantially similar to the rightward indentations described with reference to FIG. 3, except that the referencing indentations would optionally be smaller. In addition, entry lines 152 of a thread 156 may include additional rightward indentations 154 according to the times at which the messages represented by lines 152 are posted.

For example, no additional rightward indentation could be provided if the posting is made within a time threshold after the directly referenced posting. In this instance, the inferior entry line 152 could have only a referencing indentation. For a posting made after the time threshold, additional rightward indentations 154 could be applied according to the additional elapsed time. Alternatively, the additional rightward indentation could correspond to other time measurements such as time between readings of a message.

Examples of entry lines 152 with extreme additional rightward indentations are indicated at lines 152a-152d, which may be compared to corresponding lines 142a-142d in visualization 140 of FIG. 5. Lines 152a-152d correspond to messages that were posts relatively long after the other posts in those threads. It will be appreciated that the magnitudes of the additional rightward indentations need not be linear with the relevant time measurement. For example, the magnitudes of the additional rightward indentations could be logarithmic with the relevant time measurement so that elapsed times of relatively short and relatively long durations could be represented.

In one implementation of visualization 150, top-level posts 152' are all left justified in the manner illustrated in FIG. 5. In another implementation, top-level posts 152' could include time-based lateral (e.g., rightward) shifts, as illustrated in FIG. 6 with respect to a vertical time reference line 158 (illustrated to highlight the rightward shifts of top-level lines 152'). The top-most or most recent top-level line 152' remains at a current reference time location, and successively older top-level lines 152' are shifted rightward according to the elapsed time between when they were posted and the current reference time. The magnitudes of the shifting of the top-level lines 152' could be different (e.g., lower) than the magnitudes of the shifts of inferior lines 152 for the same amount of time, thereby allowing much more time to be represented in connection with inferior lines. It will be appreciated that the features of visualizations 130 (FIG. 4), 140 (FIG. 5), and 150 (FIG. 6) could be combined together in super- or sub-combinations as a unitary visualization.

FIG. 7 illustrates another alternative high-density computer display visualization format 160 of threaded posts or messages 162 in, for example, a newsgroup. High-density visualization 160 corresponds to substantially the same exemplary threaded information as visualization 120 in FIG. 3.

Threaded message visualization 160 represents most posts with narrow lines 162 in an indented threading arrangement that includes lines 162' for representing top-level posts, substantially similar to visualization 120. Visualization 160 further includes, however, a highlighted thread 164' that a user may select by clicking or resting a cursor over the thread 164 in its high-density form. Highlighted thread 164' includes enlarged lines or bars 166 in substitution for the narrow lines of the high density representation and a text label for the top-level bar 166'. Highlighted thread 164' allows a user to better discern the structure of posts in the thread.

Figure 8:
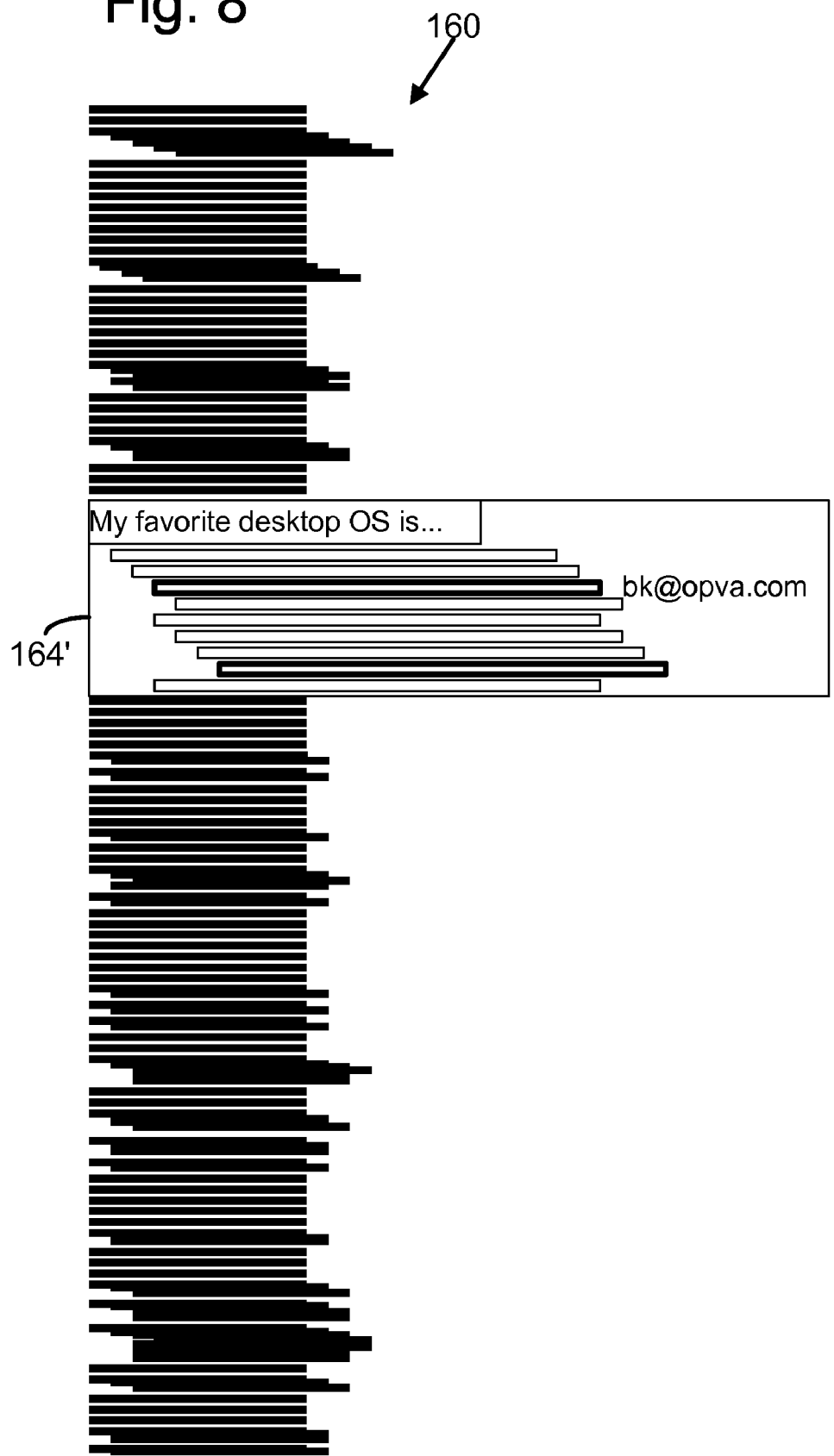
FIG. 8 illustrates a high-density threaded information visualization high highlighting of a selected thread and information entries within the thread.

As illustrated, highlighted thread 164' further allows a user to obtain additional information about individual posts 166. By clicking or resting a cursor on one of bars 166', a user may obtain additional text information about the underlying post such as the identity of the poster (as shown by the exemplary email address), the subject line or title of the post, etc. The bar 166' for which the information is provided may also be highlighted (as shown) to be more readily discernible by the user. FIG. 8 illustrates a variation of high-density computer display visualization 160 in which all messages in a highlighted thread 164' by a selected poster are highlighted (shown as darker lines).

Figure 9:
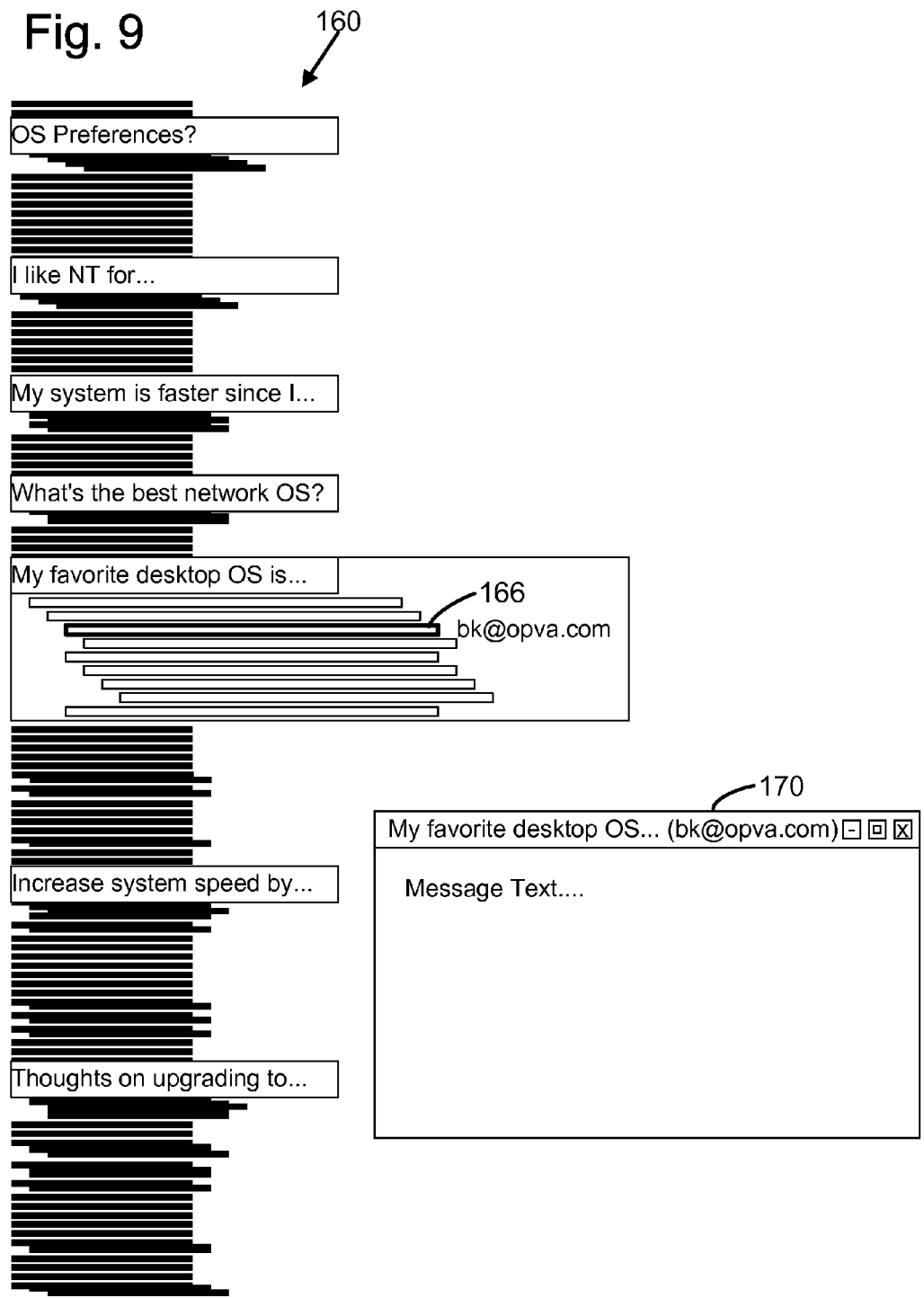
FIG. 9 illustrates a high-density threaded information visualization with a combination of features.

As illustrated, highlighted thread 164' is simplified in that it does not include the additional features of visualizations 130 (FIG. 4), 140 (FIG. 5), and 150 (FIG. 6). It will be appreciated that visualization 160 may further include features of any of visualizations 130, 140, and 150, either alone or in any combinations. FIG. 9 illustrates another variation of high-density computer display visualization 160 in combination with visualization 130 of FIG. 4. The variation of FIG. 9 includes a text or information window 170 within which is rendered some or all of the information in the post represented by selected (highlighted) bar 166.

Figure 10:
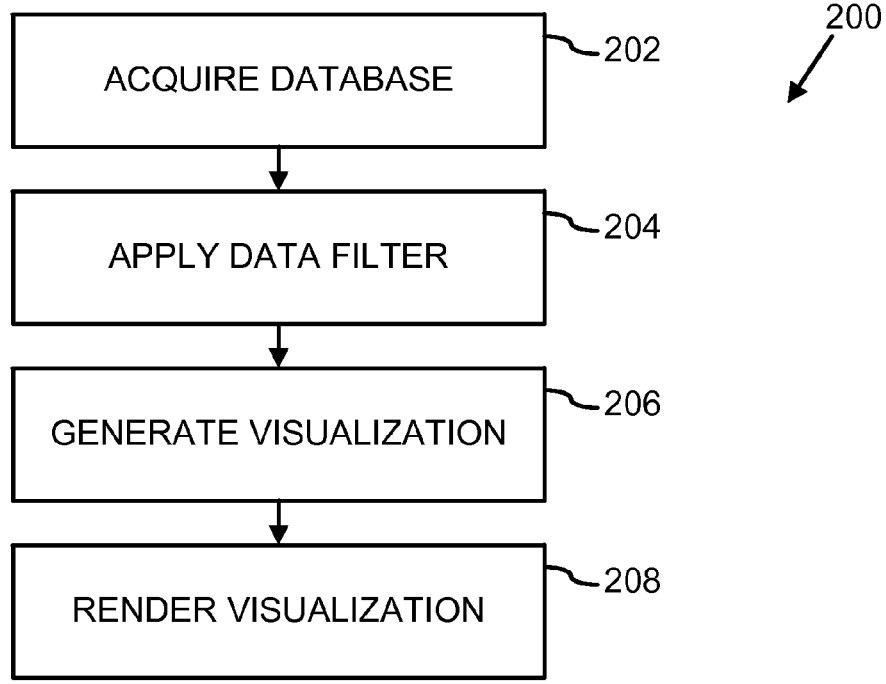
FIG. 10 is a flow diagram of a computer-controlled threaded information visualization process for visualizing threaded information.

FIG. 10 is a flow diagram of a computer-controlled interactive threaded information visualization process 200 for visualizing a threaded information environment, such as for example, information relating to a Usenet newsgroups, e-mail, etc.

Process block 202 indicates that a database is acquired for the threaded information. In one implementation the database is a relational database. With reference to obtaining information relating to a Usenet newsgroup, for example, information is obtained from the header of each posting in the selected set of newsgroups.

In one implementation, information may be obtained from the following fields in the header of each posting: From, Newsgroups, Subject, Date, Organization, Lines, Message-ID, and References. The From field identifies the poster and may include his email address and name. The Newsgroups field includes the names of other groups to which the post is cross-posted. The Subject field states the topic or title of the post. The Date field includes the time, date, and time zone of the post. The Organization includes the organization with which the poster is associated. The Lines field includes the number of lines of text in the post body. The Message-ID is a unique identifier for the post. The References field includes lists of Message-Ids of parent and ancestor messages.

Process block 204 indicates that the database is data-filtered to extract selected information, such as information about the times of the postings, amounts of information in the postings, frequencies at which posters contribute to the group, etc. This data filtering process provides a filtered set of threaded information.

Process block 206 indicates that a visualization format is generated according the filtered set of threaded information. The visualization is generated according to a selected visualization format. With reference to threaded information relating to Usenet newsgroups, for example, the selected visualization format could be any of formats 120, 130, 140, 150, or 160, or any combination of them. The visualization format may be selected by an observing user through a graphical user interface, for example. Alternatively, the format may be selected by the presenter of the threaded information.

Process block 208 indicates that the visualization is rendered on a display screen according to selected visualization style components.

Figure 11:
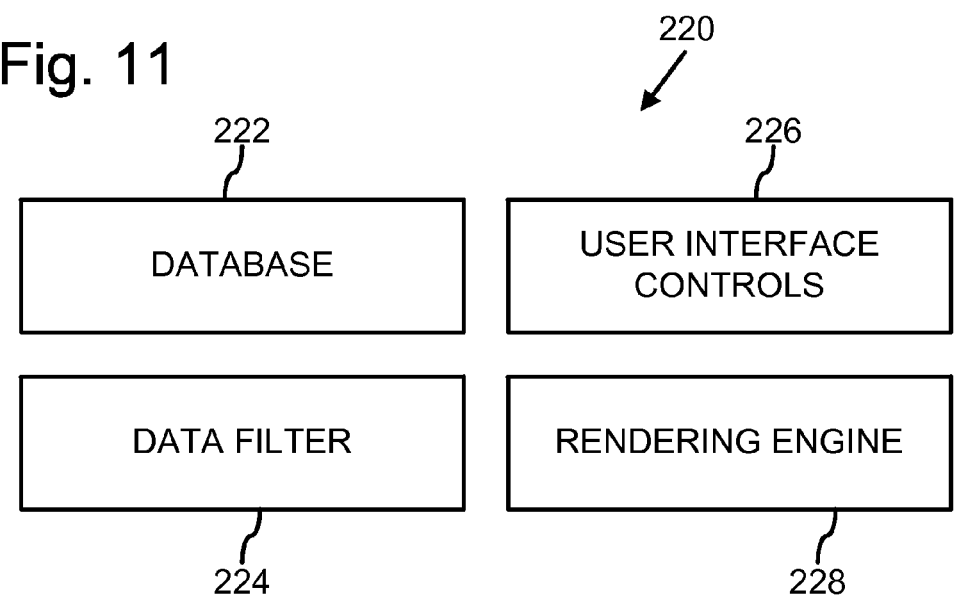
FIG. 11 is a block diagram of a threaded information visualization software system operable within a computer-readable medium according to the visualization process of FIG. 10.

FIG. 11 is a block diagram of an interactive collaborative information visualization software system 220 operable within a computer-readable medium according to visualization process 200. Visualization system 220 includes a database 222 (e.g., a relational database) of threaded information. A database filter 224 filters database 222 according to filter parameters or queries specified by a user. Database filter 224 may function as a generally conventional relational database filter.

Graphical user interface controls 226 are rendered on a display screen and allow a user to select or modify, for example, any one or combination of visualization formats 120, 130, 140, 150, and 160. A rendering engine 228 renders a network graphical visualization according to results obtained by database filter 224 and visualization format selections made with user interface controls 226.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

What is claimed is:

1. A method for providing a threaded message representation, the method comprising:
    associating at least one message with at least one identifier that does not use at least one character-based representation for describing the at least one message, wherein the at least one message is represented by a narrow entry line having a vertical height insufficient to render text characters; and
    presenting, on a computer display, the at least one message using the at least one associated identifier in a threaded message format.

2. The method as set forth in claim 1, wherein associating the at least one message with at least one identifier that does not use at least one character-based representation for describing the at least one message further comprises:
    selecting at least one identifier message length in a direction along a horizontal axis in a display area where the at least one message is presented on for the at least one identifier, wherein the message length is based on at least one message characteristic.

3. The method as set forth in claim 1, wherein associating the at least one message with at least one identifier that does not use at least one character-based representation for describing the at least one message further comprises: selecting at least one graphical characteristic for the at least one identifier based on at least one message characteristic.

4. The method as set forth in claim 1, wherein presenting the at least one message using the at least one associated identifier in a threaded message format further comprises:
    positioning at least one presented message in at least one location along a first axis in a display area where the at least one positioned message is presented on based on at least one message characteristic.

5. The method as set forth in claim 4 further comprising:
    spacing the at least one positioned message away from a second axis that is perpendicular to the first axis in the display area by a spacing distance based on at least one other message characteristic.

6. The method as set forth in claim 1, wherein presenting the at least one message using the at least one associated identifier in a threaded message format further comprises:
    spacing at least one presented message away from at least one other presented message by a minimal spacing distance that is based on a display area where the presented messages are presented on.

7. The method as set forth in claim 1, wherein presenting the at least one message using the at least one associated identifier in a threaded message format further comprises:
    arranging at least one presented message to be adjacent at least one other presented message without spacing the presented messages away from each other on a display area.

8. A method for creating a threaded message representation, the method comprising:
    identifying a relationship between at least two messages that are to be presented in the threaded message representation, wherein the at least two messages are each represented by a narrow entry line having a vertical height insufficient to render text characters; and
    presenting, on a computer display, a non-textual identifier for at least one of the messages that conveys the relationship between the messages.

9. The method as set forth in claim 8, further comprising:
    selecting an identifier message length in a direction along a horizontal axis in the threaded message representation for the non-textual identifier, wherein the message length is based on at least one message characteristic.

10. The method as set forth in claim 8, further comprising:
    selecting at least one graphical characteristic for the non-textual identifier based on at least one message characteristic.

11. The method as set forth in claim 8, wherein presenting a non-textual identifier for at least one of the messages that conveys the relationship between the messages further comprises:
    positioning the non-textual identifier in a location along a first axis in the threaded message representation based on at least one message characteristic.

12. The method as set forth in claim 8, wherein presenting a non-textual identifier for at least one of the messages that conveys the relationship between the messages further comprises:
    spacing the non-textual identifier away from another non-textual identifier by a minimal spacing distance that is based on a display area where the threaded message representation is presented on.

13. The method as set forth in claim 8, wherein presenting a non-textual identifier for at least one of the messages that conveys the relationship between the messages further comprises:
    arranging the non-textual identifier to be adjacent to another non-textual identifier without spacing the non-textual identifiers away from each other in the threaded message representation.

* * * * *